United States Patent [19] [11] 4,379,823
Halm [45] Apr. 12, 1983

[54] COMPOSITION FOR FORMING PHOTOCONDUCTIVE COATING CONTAINING A PHOTOCONDUCTIVE DONOR AND AN ACCEPTOR-SENSITIZER

[75] Inventor: James M. Halm, Lombard, Ill.

[73] Assignee: A. B. Dick Company, Niles, Ill.

[21] Appl. No.: 153,881

[22] Filed: May 27, 1980

Related U.S. Application Data

[63] Continuation-in-part of Ser. No. 131,150, Mar. 17, 1980, abandoned, which is a continuation of Ser. No. 897,719, Apr. 19, 1978, abandoned, which is a continuation-in-part of Ser. No. 738,147, Oct. 29, 1976, abandoned.

[51] Int. Cl.³ .......................... G03G 5/09; G03G 5/04
[52] U.S. Cl. ......................................... 430/83; 430/70; 430/81; 430/900; 430/135
[58] Field of Search .......................... 430/83, 135, 900

[56] References Cited

U.S. PATENT DOCUMENTS 4,123,268  10/1978  Halm ..................................... 430/83

*Primary Examiner*—John E. Kittle
*Assistant Examiner*—John L. Goodrow
*Attorney, Agent, or Firm*—McDougall, Hersh & Scott

[57] ABSTRACT

A photoconductive layer embodies the combination of an organic photoconductive donor compound, such as poly(N-vinyl) carbazole and derivatives thereof, and an acceptor-sensitizer compound having the general formula

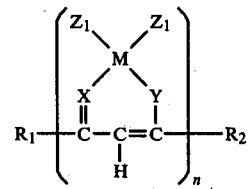

in which M is a metal such as boron, aluminum, gallium, indium and thallium, X and Y are oxygen sulphur, nitrogen, phosphorus, antimony or selenium, $Z_1$ and $Z_2$ are halogen, or substituted or unsubstituted alkyl, alkaryl or heterocyclic groups, $R_1$ and $R_2$ are substituted or unsubstituted aryl, alkaryl, alkyl or alicyclic groups, and n is 2 or 3.

23 Claims, 1 Drawing Figure

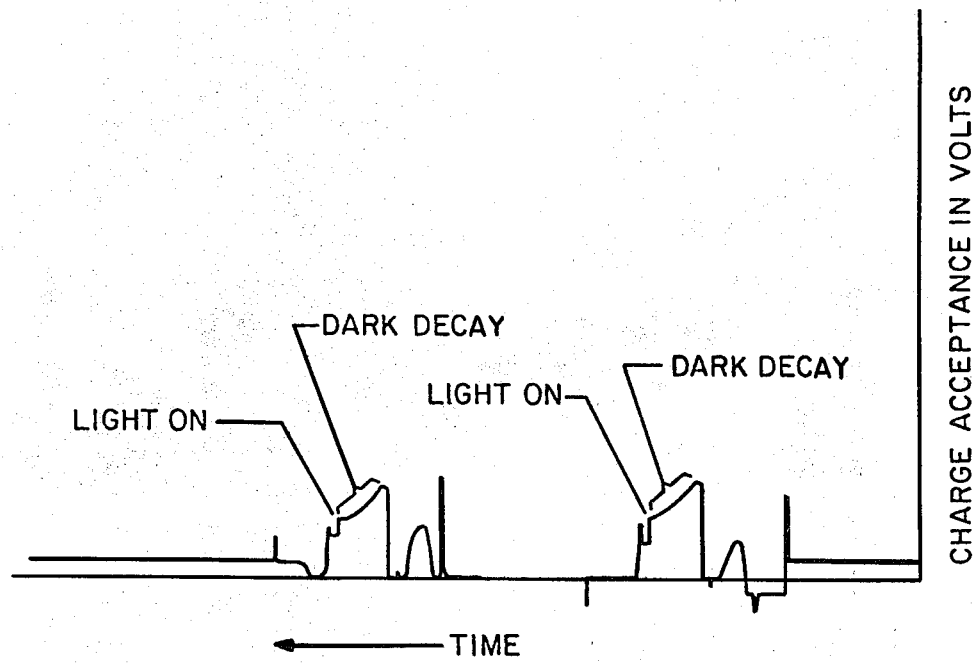

COMPOSITION FOR FORMING PHOTOCONDUCTIVE COATING CONTAINING A PHOTOCONDUCTIVE DONOR AND AN ACCEPTOR-SENSITIZER

This is a continuation-in-part of my copending application Ser. No. 131,150 filed Mar. 17, 1980 now abandoned; which is a continuation of application Ser. No. 897,719, filed Apr. 19, 1978 (now abandoned), filed as a continuation-in-part of application Ser. No. 738,147, filed Oct. 29, 1976, and entitled "Photoconductive Coating and Compositions" (now abandoned).

This invention relates to a new and improved photosensitive photoconductor composition and to photoconductive elements produced thereof for use in the preparation of photographic film and copies by electrophotographic technique.

To the present, use has been made of inorganic photoconductive materials, such as selenium in plain paper copies, or photoconductive zinc oxides formulated into a coating composition with suitable binder to provide a photoconductive coating for the production of copies as described in the Grieg U.S. Pat. No. 3,052,539, or the Middleton U.S. Pat. No. 3,121,006.

Considerable effort has been expended toward the development of a photoconductive element which involves the use of an organic photoconductor to enable use on film as well as paper or other suitable support.

As described in U.S. Pat. No. 3,684,506 and U.S. Pat. No. 3,967,264, polyvinyl carbazole and derivatives thereof, such as n-alkenyl carbazoles, substituted-n-vinyl carbazoles and polymers and copolymers thereof, such as dibromo polyvinyl carbazole and polyvinyl iodobenzo carbazole, as well as triphenyl amine have the desired photoconductive properties to enable formulation with suitable binders into photoconductive coatings. However, such materials, hereinafter referred to as donor compounds, are characterized by slow conductivity and, by themselves, do not show sufficient conductivity for use commercially as a photoconductive material. It has been found that the charge acceptance and sensitivity of such donor compounds can be increased sufficiently for commercial use in photoconductive elements when combined for synergistic reaction with an acceptor-sensitizer to form a composite photoconductive layer in accordance with the practice of this invention.

Thus, it is an object of this invention to provide the combination of an acceptor-sensitizer with a donor compound in a composition sufficient for use in the production of photoconductive elements and it is a related object to provide a photoconductive composition of the type described which can be applied to form a photoconductive layer on transparent film, paper, metal or other conductive substrate.

It is a related object to provide a distinctly new class of acceptor-sensitizer compounds which can form photosensitive and photoconductive layers with conventional organic donors by charge transfer complexation.

These and other objects and advantages of this invention will hereinafter appear and for purposes of illustration, but not of limitation, an embodiment of the invention is shown in the accompanying drawing, in which:

The FIGURE is a perspective view, partially in section, of a fragmentary portion of a photoconductive element embodying the features of this invention.

The acceptor-sensitizer employed in the practice of this invention is characterized by the following general formula

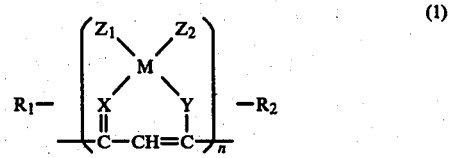

in which M is a metal or metaloid entity such as aluminum, gallium, indium, thalium, but preferably boron; X and Y, which may be the same or different, are selected of the group consisting of sulphur, nitrogen, phosphorus, antimony, selenium, and preferably oxygen; $Z_1$ and $Z_2$, which may be the same or different, preferably are fluorine, but instead may be another halogen such as chlorine or bromine; an aryl, alkaryl or heterocyclic group, such as phenyl, tolyl, naphthyl, anthracyl, furyl, pyrryl, idolyl, pyrimidyl, pyridyl and furfuryl, or substituted derivatives thereof in which the substituents can be halogen, such as chlorine, bromine, fluorine, iodine; alkoxy groups such as methoxy, alkoxy or other $C_1$–$C_{10}$ alkoxy groups, or other aryl, alkaryl or heterocyclic group of the type described above; alkylates such as acetate, propionate, or other $C_2$–$C_{10}$ alkylate, or an oxygen substituted ligand; $R_1$ and $R_2$ may be the same or different and may be aryl or alkaryl, such as phenyl, tolyl, naphthyl, anthracyl and the like, and substituted derivatives thereof in which the substituents are as defined above, and preferably halogen or electron-withdrawing groups such as $CF_3$; alkyl or alicyclic groups or substituted derivatives thereof in which the substituents are as defined above and in which the alkyl group is methyl, ethyl, propyl, isopropyl, butyl, isobutyl, tertiary butyl, or other $C_1$–$C_{10}$ alkyl, and in which the alicyclic groups are cyclopropyl, cyclobutyl, cyclopentyl and the like; n is 2 or 3 but may be 1 when $R_1$ is

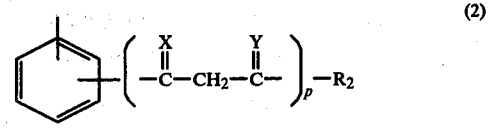

in which p is either 1 or 2.

In a preferred ramification, n is 2 as represented by the following general formula in which $R_1$, $R_2$, $Z_1$, $Z_2$, X and Y have the same meaning as above:

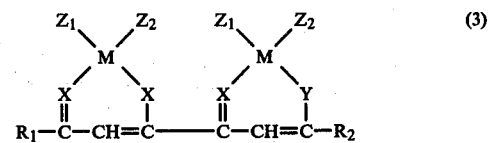

The following structural formulae illustrate specific embodiments of this invention in which the functional groups X and Y are represented by oxygen and in which $BF_3$ was used as the chelating agent.

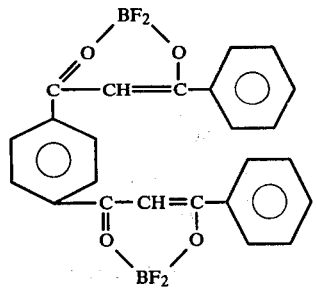
(4)

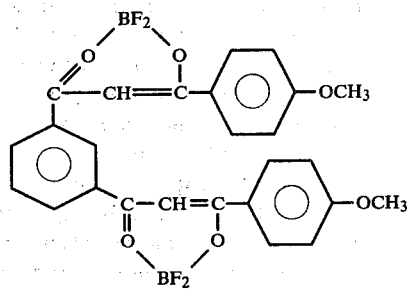
(5)

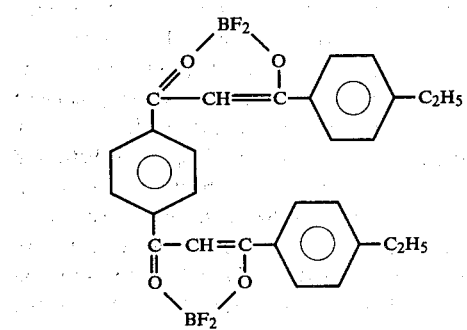
(6)

The fundamental reaction in the preparation of phthalato-chelates, included within the practice of this invention, involves the chelation of an appropriate ligand, as illustrated by the following equation in which a $BZ_2$ moiety is used as the chelating component:

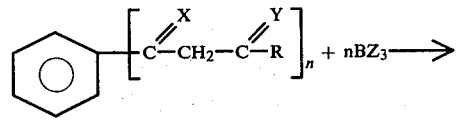

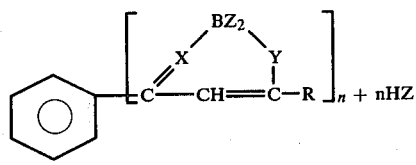
(8)

A number of routes can be used to obtain the appropriate ligand, one of which is illustrated by the following equation:

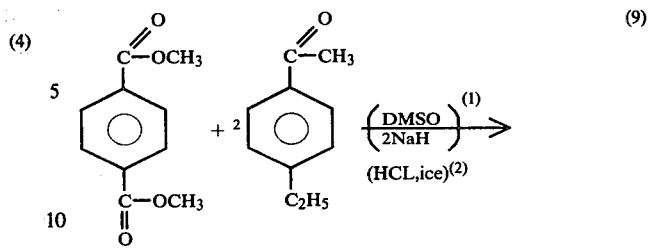
(9)

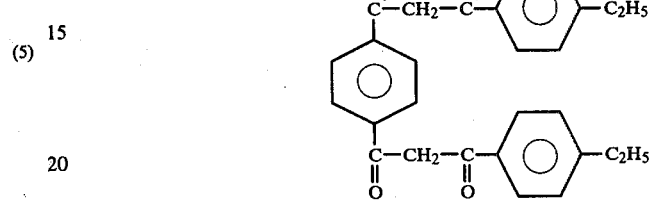

In a preferred mode of preparation, an oxalato ester is reacted with an alkyl ketone in a Cross Claisen condensation reaction, followed by chelation with a $BF_3$ etherate, as illustrated by the following two step process in which $BF_3$ is again used as the chelating agent:

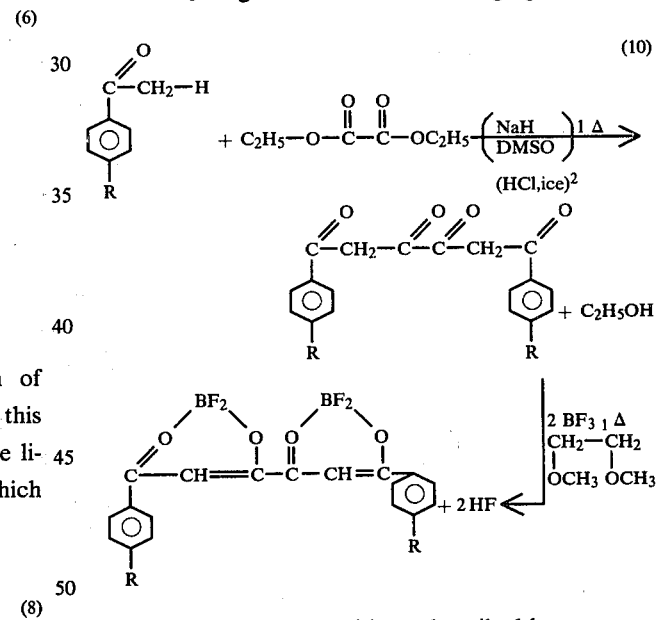
(10)

The acceptor type sensitizers described have a number of properties which enable their effective use with donor compounds in the preparation of commercially acceptable photoconductive elements. They are stable in air over indefinite and extended periods of time; they are non-hygroscopic; easy to handle as crystalline solids; and exist as a family of sensitizers in which the properties can be varied by appropriate attenuation of structural features, as by modifications within the structural formula. Such structural changes may be made to reflect property changes such as solubility, geometry, adhesion, π cloud relationships, polarographic half wave potentials, dipole moment, film strength with given donors; charge acceptance, electrophotographic sensitivity; dark decay; trapping characteristics; polarity of conduction, and the like. The diversity of properties, coupled with the ability to control such properties by attenuation of the formula, offers considerable advantage to the preparation of photoconductive layers having tailormade properties, especially when formulated with various compatible materials.

The oxalato-chelate compounds of this invention appear to enjoy a synergistic reaction which enhances the photoconductivity of coatings containing donor compounds having intrinsic photoconductivity, such as triphenyl amines, polyvinyl carbazoles, dibromo polyvinyl carbazoles, polyvinyl iodobenzo carbazoles, and various derivatives of vinyl carbazoles as described in U.S. Pat. Nos. 3,928,035; 3,929,478; 3,684,506; 3,697,264, and 3,484,237, as well as other photoconductive donor compounds well known in the art. The following will illustrate by structural formulae carbazoles which can be employed as preferred donor compounds when in the polymerized state:

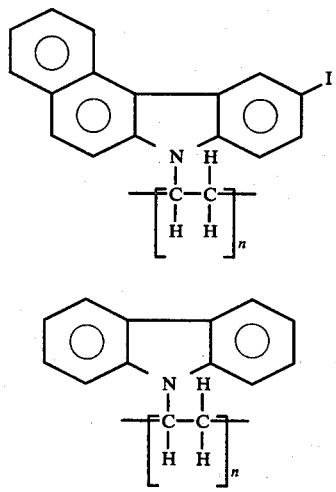

The combination of materials is effective to produce commercially acceptable photoconductive elements for electrostatic image when the materials are present in the ratio of one part by weight acceptor-sensitizer to 3–500 parts by weight and preferably 10–100 parts by weight of donor compound or compounds when in solution in the coating composition; and one part by weight of the oxalato-chelate sensitizer to 1–20 parts by weight and preferably 2–10 parts by weight donor compound or compounds when applied from suspension, as in a pigment containing composition.

When applied from solution, a factor which controls the amount of materials in the coating composition is the solubility of the oxalato-chelate sensitizer in the solution in suitable solvent, as represented by tetrahydrofuran, cyclohexane, or mixtures thereof, with the components present in the solution in total solids of 1–10% by weight and with a higher concentration of solids in a pigment containing solution, such as within the range of 2–25% by weight.

The photoconductor element can be prepared, in accordance with the practice of the invention, by application of the composition to form a layer on a suitable substrate, such as a rigid plate or drum formed of glass, plastic, or metal such as silicated aluminum. Instead, the substrate can be in the form of a highly flexible element such as a sheet, plate, drum or endless belt formed of a highly conductive paper, plastic, paper-metal laminate, or silicated aluminum.

Many of the acceptor-sensitizers of this invention can be formulated with donor compounds into compositions that produce transparent coatings of high photopic transmission. Such compositions can be used for coating a transparent conductive substrate to provide a photoconductive transparent film suitable for use as a microfilm or similar structures which can be imaged by electrophotographic technique. Since many of the formulations having high photopic transmission are of a light yellow color, they can provide for a toned black image on a light yellow background.

The materials are formulated into a composition for coating onto the substrate 10 by dissolving the materials in a suitable solvent or by suspension of the materials in a suitable organic liquid carrier. The materials can be worked into solution or suspension on a roller mill and the like and coated onto the substrate 10 by conventional coating techniques. The applied coating is then air dried or drying is accelerated at elevated temperature, such as within the range of 50° to 100° C. to provide a photoconductive coating 12 on the substrate 10.

The photoconductive element can be imaged in the usual manner to provide a latent electrostatic image 14 which can be developed with a liquid or powder developer to provide a visible image 16 which can be fixed to the element as copy, or transferred for fixing onto another element, such as paper, as in a plain paper copier.

Having described the basic concepts of the invention, illustration will be made by reference to the following examples which are given by way of illustration and not by way of limitation.

EXAMPLE 1

Preparation of ligand 7 grams sodium hydride in oil suspension are stirred into 150 ml of dimethyl sulfoxide at room temperature during a 15 minute period. 7.3 grams of diethyl oxalate are added with stirring. A nitrogen bubbler is attached with a condenser in a three-necked flask and the reaction is carried out under a nitrogen blanket. 14.8 grams of 4'-ethylacetophenone in 100 ml of dimethyl sulfoxide are added dropwise from a dropping funnel. The exothermic reaction is moderated, as foaming occurs, by an ice water bath. The reaction mixture is allowed to stand for two hours after the ethylacetophenone has been added and is then heated cautiously to 50° C. and held at that temperature for three hours. The reaction mixture is allowed to cool to ambient temperature and then is maintained at that temperature overnight.

The red reaction mixture is poured onto ½ liter of ice and the resulting yellow solid is dissolved in 200 ml of methylene chloride which is washed two times with 100 ml of water and two times with 100 ml of a saturated sodium bicarbonate solution.

The methylene chloride solution is dried over sodium sulphate and concentrated to one-third the original volume on a steam line. The methylene chloride solution is placed in a freezer at 0° C. and the precipitate is collected by vacuum filtration to yield a ligand having the following chemical structure:

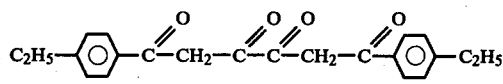

containing 74% carbon and 6.29% hydrogen and a melting point within the range of 170° to 172° C.

Preparation of chelate 0.01 mole of the ligand is added to 100 ml of 1,2-dimethoxyethane solvent. The mixture is heated to 50° C. with stirring under a nitrogen blanket. 0.2 ml of trifluoroboron etherate, dissolved in 50 ml of 1,2-dimethoxyethane solvent is added dropwise. The mixture is brought to reflux temperature (about 83° C.) and held at reflux for four hours. The solvent is stripped to one-third its original volume and the concentrate is cooled to ambient temperature and poured into high boiling petroleum ether. The mixture is cooled overnight at 0° C. and the resulting precipitate is removed by filtration under vacuum.

The precipitate is purified by fractionation in a Soxhlet extractor using acetone as solvent.

Preparation of photoconductor 1.0 gram of the chelate, 10.0 grams of polyvinyl carbazole and 2 drops of leveling agent are mixed into 110 ml of tetrahydrofuran and cyclohexanone in the ratio of 70 parts by weight tetrahydrofuran to 30 parts by weight cyclohexanone. The formulation was roller milled for six hours, filtered and coated by dip-meniscus technique onto a silicated aluminum substrate. After air drying for about ½ hour, the coating was cured by heating to 100° C. for 70 minutes. The photoconductivity of the plate, under tungsten radiation and corona set at 6 KV, was illustrated by the following properties:

positive mode charge acceptance=860 volts; residual voltage=50 volts; dark decay=4 volts/sec; sensitivity to t(½) of the decay curve bottom=98 $\mu J/cm^2$.

negative mode charge acceptance=700 volts; residual voltage=75 volts; dark decay=3 volts/sec; sensitivity to t(½) of the decay curve bottom=169 $\mu J/cm^2$.

This deep yellow coating had a high photopic transmission. Thirty consecutive plain paper copies were run off from this photoconductive plate with the use of a commercial copy machine. No fatigue was evident. The physical properties of the plate were very good judged on the basis of the adhesive tape test and general handling characteristics.

EXAMPLE 2

The oxalato-chelate was prepared as in Example 1 except that 2',4'-dimethylacetophenone was substituted for the 4-ethylacetophenone.

The resulting ligand was chelated with BF₃ and this compound was dissolved in hot dry chloroethane and filtered through charcoal in two succeeding operations. Re-crystallization was made from hot chloroethane by the addition of n-haptane to produce a compound having the general formula

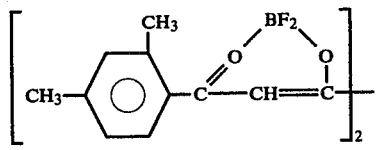

(14)

The chelate was formulated into a coating composition by admixture of 0.96 gram in 100 ml of a 10% solution of polyvinyl carbazole in THF/cyclohexanone (70/30%). A few drops of leveling agent were added and this formulation was coated onto a silicated aluminum substrate with a #40 wire wound rod.

The coating was cured for one hour at 100° C.

The coating was photoconducted under tungsten radiation and a 6 KV corona with the following electrophotographic properties:

positive mode charge acceptance=300 volts; residual voltage=25 volts; dark decay=4.0 volts/sec; sensitivity to t(½) of the decay curve bottom=143 $\mu J/cm^2$.

negative mode charge acceptance=410 volts; residual voltage=35 volts; dark decay=10 volts/sec; sensitivity to t(½) of the decay curve bottom=157 $\mu J/cm^2$.

This deep yellow coating had a high photopic transmission. Several consecutive plain paper copies were made from this coating with a commercial copy maching. Short consecutive runs with this coating material did not exhibit evidence of fatigue.

EXAMPLE 3

The oxalato-chelate was prepared as in Example 1 except that 4'-methoxyacetophenone was substituted for 4'-ethylacetophenone. The chelate formed by reaction with BF₃ was washed three times with trichloroethane in 100 ml portions. The red product was insoluble in coating solvents such that it was used in the preparation of a pigmented coating with polyvinyl chloride. For this purpose, 6 grams of the oxalato-chelate and 15 grams of polyvinyl carbazole in 100 ml of THF/cyclohexanone (40/60%) was roller milled for five days with glass beads. The pigmented formulation was coated onto silicated aluminum with a #40 wire wound rod and the coating was cured at 100° C. for one hour.

Under tungsten radiation and 6 KV corona, the electrophotographic properties of the plate were as follows:

positive mode charge acceptance=150 volts; residual voltage=20 volts; dark decay=6.5 volts/sec; sensitivity to t(½) of the decay curve bottom=1080 $\mu J/cm^2$.

negative mode charge acceptance=280 volts; residual voltage=5 volts; dark decay=7 volts/sec; sensitivity to t(½) of the decay curve bottom=96 $\mu J/cm^2$.

EXAMPLE 4

The oxalato-chelate of Example 3 was used to saturate a 10% polyvinyl carbazole solution in THF/cyclohexanone (70/30%). Less than 0.1 gram of the slightly soluble oxalato-chelate dissolved in 100 ml of the above solution. This solution was coated onto a silicated aluminum substrate with a #40 wire wound rod and the coating cured for 1½ hours at 100° C.

Under tungsten radiation and 6 KV corona, the electrophotographic properties of the plate were as follows:

postive mode charge acceptance=350 volts; residual voltage=65 volts; dark decay=3 volts/sec; sensitivity to t(½) of the decay curve bottom=400 $\mu J/cm^2$.

negative mode charge acceptance=275 volts; residual voltage=50 volts; dark decay=3 volts/sec; sensitivity to t(½) of the decay curve bottom=368 $\mu J/cm^2$.

This yellow solution coating had a high photopic transmission.

EXAMPLE 5

The oxalato-chelate was prepared as in Example 1 except that 4'-fluoroacetophenone was substituted for equivalent amount of the 4'-ethylacetophenone. The ligand chelated with $BF_3$ etherate yielded an orange crystallized product which was used in an amount to saturate a 40/60% THF/cyclohexanone solution containing 10% polyvinyl carbazole. The concentration of the saturated solution was calculated as 0.05 gram of chelate per 100 ml of solution.

A coating on silicated aluminum was made with a #40 wire wound rod and the coating was cured for one hour at 100° C. The yellow transparent coating of high phototopic transmission was photoconducted under tungsten radiation and 6 KV corona with the following properties:

positive mode charge acceptance=330 volts; residual votage=50 volts; dark decay=3 volts/sec; sensitivity to $t(\frac{1}{2})$ of the decay curve bottom=202 $\mu J/cm^2$.

negative mode charge acceptance=525 volts; residual voltage=90 volts; dark decay=3 volts/sec; sensitivity to $t(\frac{1}{2})$ of decay curve bottom=200 $\mu J/cm^2$.

EXAMPLE 6

The oxalato-chelate was prepared as in Example 1 except that 4'-bromoacetophenone was substituted for the 4'-ethylacetophenone in equivalent amount. The chelate of $BF_3$ was recrystallized as a yellow-brown solid by the addition of n-heptane to a solution in hot trichloroethane.

A THF/cyclohexanone (40/60%) solution containing 0.97 gram of the above sensitizer in 50 ml of a 10% polyvinyl carbazole solution and a few drops of a leveling agent was coated onto a silicated aluminum substrate with a #40 wire wound rod. The plate was cured at 100° C. for one hour.

The yellow transparent coating photoconducted under tungsten radiation and 6 KV corona with the following electrophotographic properties:

positive corona charge acceptance= +350 volts; residual voltage=20 volts; dark decay=2.0 volts/sec; sensitivity to $t(\frac{1}{2})$ of the decay curve bottom=495 $\mu J/cm^2$.

negative mode charge acceptance= −498 volts; residual voltage=20 volts; dark decay=3.5 volts/sec; sensitivity to $t(\frac{1}{2})$ of decay curve bottom=478 $\mu J/cm^2$.

EXAMPLE 7

The sensitizer of Example 5 was used to saturate 100 ml of THF/cyclohexanone (80/20%) containing 10% polyvinyl iodobenzocarbazole. A leveling agent was added to the formulation and a coating struck on a silicated aluminum substrate with a #40 wire wound rod. The coating was cured for one hour at 100° C. The photoconductive properties of the formed transparent coating, under tungsten radiation and 6 KV corona, were as follows:

positive mode charge acceptance=100 volts; residual voltage=- none; dark decay=3.0 volts/sec; sensitivity to $t(\frac{1}{2})$ of the decay curve=100 $\mu J/cm^2$.

negative mode charge acceptance=100 volts; residual voltage=- none; dark decay=3.0 volts/sec; sensitivity to $t(\frac{1}{2})$ of the decay curve bottom=175 $\mu J/cm^2$.

EXAMPLE 8

The sensitizer compound of Example 1 was formulated with polyvinyl iodobenzocarbazole, in 80/20 THF/cyclohexanone solution containing 10% by weight of the carbazole and 1.5% by weight of the acceptor-chelate. A leveling agent was added and the solution was coated onto a silicated aluminum substrate with a #40 wire wound rod. The coating was cured for one hour at 100° C.

The photoconductive properties of the transparent coating under tungsten radiation and 6 KV corona were as follows:

positive mode charge acceptance= +160 volts; residual voltage=10 volts; dark decay=nil; sensitivity to $t(\frac{1}{2})$ of the decay curve bottom=157 $\mu J/cm^2$.

negative mode charge acceptance= −180 volts; residual voltage=20 volts; dark decay=nil; sensitivity to $t(\frac{1}{2})$ of the decay curve=200 $\mu J/cm^2$.

EXAMPLE 9

The sensitizer compound of Example 2 was formulated with polyvinyl iodobenzocarbazole by addition of 2 grams to a 10% solution of the carbazole in 80/20 THF/cyclohexanone. The solution was filtered and a coating was made on a silicated aluminum substrate with a #40 wire wound rod. The coating was cured for one hour at 100° C.

The photoconductive properties of the transparent coating under tungsten radiation and 6 KV corona were as follows:

postive mode charge acceptance= +190 volts; residual voltage=20 volts; dark decay=5.0 volts/sec; sensitivity to $t(\frac{1}{2})$ of the decay curve bottom=119 $\mu J/cm^2$.

negative mode charge acceptance= −180 volts; residual voltage=20 volts; dark decay=3.0 volts/sec; sensitivity to $t(\frac{1}{2})$ of the decay curve bottom=169 $\mu J/cm^2$.

EXAMPLE 10

A 50 ml portion of 10% polyvinylcarbazole in THF was roller milled with 0.5 gram of the compound of formula(6) for five days. The undissolved residue was left to settle for a day and a clear solution obtained by vacuum filtration. This formulation was coated onto a silicated aluminum substrate with a #40 wire wound rod and the coating was cured for one hour at 50° C. The electrical properties of this coating toward tungsten radiation and 6 KV corona were:

$V_o$= +550 volts, $V_R$= +40 volts, DD= +6.0 volts/sec, $kt^{\frac{1}{2}}$= +51 $\mu J/cm^3$ $V_o$= −500 volts, $V_R$= −60 volts, DD= −5.0 volts/sec, $kt^{\frac{1}{2}}$= −130 $\mu J/cm^2$ This coating was transparent, was of high photopic transmission, and gave several plain paper copies of a test target from a commercial copy machine using positive corona and toner.

EXAMPLE 11

A 50 ml portion of 10.5% DBPVK

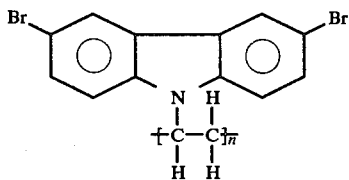

was roller milled with 0.5 gram of the compound of formula (6) for a day, the residue left to settle, and the clear polymeric solution obtained by filtration. This formulation was coated onto a silicated aluminum substrate with a #40 wire wound rod, and the coating dried for one hour at 100° C. The electrical properties toward tungsten radiation and 6 KV corona were:

$V_o = +350$ volts, $V_R = < +10$ volts, DD $= < +1$ volt/sec, $kt_{\frac{1}{2}} = +150$ $\mu J/cm^2$ $V_o = -470$ volts, $V_R = 20$ volts, DD $= 1.0$ volt/sec, $kt_{\frac{1}{2}} = -160$ $\mu J/cm^2$

EXAMPLE 12

A 10 gram quantity of NVK (12) was polymerized thermally in the presence of 0.15 gram DMDBBF$_2$ (7) which acted as an initiating catalyst. A 10% (THF/cyclohexanone=40/60%) solution of the reaction products was saturated with LEBF$_2$ (6) and the solution filtered. The clear polymer solution was coated onto a silicated aluminum substrate with a #40 wire wound rod to give a transparent coating of high photopic transmission. The electrophotographic properties of this coating toward tungsten radiation and 6 KV corona were:

$V_o = +440$ volts, $V_R = +30$ volts; DD $= +3.0$ volts/sec, $kt_{\frac{1}{2}} = +120$ $\mu J/cm^2$ $V_o = -530$ volts, $V_R = -50$ volts, DD $= -6.7$ volts/sec, $kt_{\frac{1}{2}} = -180$ $\mu J/cm^2$ Several plain paper copies were made from this plate using a commercial copy machine with positive corona and toner.

EXAMPLE 13

The compound LMBF$_2$ (5) was ball milled with a 10% solution of PVK (13) in THF such that the ratio of acceptor/donor was 2 g/4 g. The resulting pigmented formulated was spray coated onto a silicated aluminum substrate in a four pass process, each coat being allowed to dry before the next was applied. This multiple coated element exhibited strong adhesion and had good resistance to cracking and crazing. The electrophotographic properties toward tungsten radiation and 6 KV corona, after a cure time of one hour at 50° C., were:

$V_o = +670$ volts, $V_R = +50$ volts, DD $= +3.3$ volts/sec, $kt_{\frac{1}{2}} = 159$ $\mu J/cm^2$ $V_o = -700$ volts, $V_R = -50$ volts, DD $= -1.0$ volts/sec, $kt_{\frac{1}{2}} + -1209$ $\mu J/cm^2$

EXAMPLE 14

The compound LMBF$_2$ (5) was ball milled with a 10% solution of PVIBK

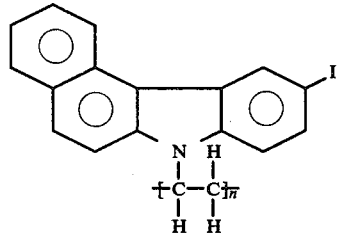

in THF such that the ratio of acceptor/donor was 2 g/4 g. The resulting pigmented formulation, after 24 hours on the mill, was coated onto silicated aluminum substrate with a #40 wire wound rod. This coating had good adhesion and exhibited the following electrophotographic properties toward tungsten radiation and 6 KV corona:

$V_o = +360$ volts, $V_R = +15$ volts, DD $= +6$ volts/sec, $kt_{\frac{1}{2}} = +168$ $\mu J/cm^2$ $V_o = -350$ volts, $V_R = -25$ volts, DD $= -3$ volts/sec, $kt_{\frac{1}{2}} = -356$ $\mu J/cm^2$

EXAMPLE 15

A pigmented coating was made from LMBF$_2$ (5) and PVIBK (11) formulated as in Example 13 and applied by the spray process as there described. This pigmented coating, on an aluminum substrate, exhibited the following electrophotographic properties toward tungsten radiation:

$V_o = +850$ volts, $V_R = +40$ volts, DD $= +10.5$ volts/sec. $kt_{\frac{1}{2}} = +87$ $\mu J/cm^2$ $V_o = -900$ volts, $V_R = -50$ volts, DD $= -3$ volts/sec, $kt_{\frac{1}{2}} = -512$ $\mu J/cm^2$

EXAMPLE 16

A saturated THF solution of LMBF$_2$ (5) was made 10% in PVK and the residue filtered off to provide a clear solution. A saturated THF solution is ca. (0.2–0.3) g/100 ml solution. The formulation was coated onto a silicated aluminum substrate with a #40 wire wound rod to provide a clear transparent coating which exhibited the following electrophotographic properties:

$V_o = +480$ volts, $V_R = +35$ volts, DD $= +1.0$ volt/sec, $kt_{\frac{1}{2}} = +220$ $\mu J/cm^2$ $V_o = -410$ volts, $V_R = -30$ volts, DD $= -1.0$ volt/sec, $kt_{\frac{1}{2}} = -270$ $\mu J/cm^2$

EXAMPLE 17

A THF mixture of PVK and LMBF$_2$ (4) was made 11% in solids where the ratio of LMBF$_2$/PVK $= \frac{1}{2}$ by wt. The mixture was ball milled for two days after which the pigment was coated onto a silicated aluminum substrate with a #40 wire wound rod. The electrophotographic properties of this coating toward tungsten radiation were:

$V_o = +600$ volts, $V_R = 20$ volts, DD $= +1.1$ volt, sec. $kt_{\frac{1}{2}} = +183$ $\mu J/cm^2$ $V_o = -490$ volts, $V_R = -25$ volts, DD $= -2.1$ volt/sec, $kt_{\frac{1}{2}} = -231$ $\mu J/cm^2$

EXAMPLE 18

The formulation in Example 17 was sprayed onto an aluminum substrate as described in Example 13 and the coating was heated at 50° C. for one hour in a ventilated oven. The electrophotographic properties of this coating toward tungsten radiation were:

$V_o = +800$ volts, $V_R = +40$ volts, DD $= +23$ volts/sec, $kt_{\frac{1}{2}} = +55$ $\mu J/cm^2$ $V_o = -890$ volts, $V_R = -60$ volts, DD=6.1 volts/sec, $kt_{\frac{1}{2}} = -395$ μJ/cm$^2$

EXAMPLE 19

A pigmented suspension was made by ball milling a 10% PVIBK (11) solution of THF with LHBF$_2$ (4) in the weight ratio LHBF$_2$/PVIBK=$\frac{1}{4}$. After two days, the suspension was coated onto an aluminum substrate with a #40 wire wound rod, and heated in an oven at 50° C. for one hour. This coating exhibited the following electrophotographic properties toward tungsten radiation and 6 KV corona:

$V_o = +370$ volts, $V_R = +20$ volts, DD=+3 volts/sec, $kt_{\frac{1}{2}} = 80$ μJ/cm$^2$ $V_o = -290$ volts, $V_R = -15$ volts, DD=-3 volts/sec, $kt_{\frac{1}{2}} = 82$ μJ/cm$^2$

EXAMPLE 20

A two gram sample of triphenylamine, which was recrystallized from acetone, was dissolved in 60 ml of THF containing five grams of Monsanto RP1323 resin. A 5 gram sample of (6) was added and the mixture was roller milled for several hours. The mixture was filtered and the solution was coated onto an aluminum substrate with a #40 wire wound rod. The coating was heated for one hour at 50° C. It exhibited the following electrophotographic properties:

$V_o = +380$ volts, $V_R = +10$ volts, DD=12.0 volts, sec, $kt_{\frac{1}{2}} = +315$ μJ/cm$^2$ $V_o = -450$ volts, $V_R = -30$ volts, DD=14.0 volts/sec, $kt_{\frac{1}{2}} = -720$ μJ/cm$^2$

EXAMPLE 21

A 2 gram sample of triphenylamine, recrystallized from acetone, was dissolved in 50 ml of THF containing 5 grams of Monsanto RP1323 resin. This solution was saturated with LHBF$_2$ (5) and the solution was coated onto an aluminum substrate. The coating was heated for one hour at 50° C. It was light yellow and of high photopic transmission. It exhibited the following electrophotographic properties:

$V_o = +400$ volts, $V_R = +50$ volts, DD=4.0 volts/sec, $kt_{\frac{1}{2}} = +442$ μJ/cm$^2$ $V_o = -400$ volts, $V_R = -30$ volts, DD=6.6 volts/sec, $kt_{\frac{1}{2}} = -773$ μJ/cm$^2$ The following examples are for purposes of comparison with coatings formulated of a photoconductive donor compound, but without the benefit of the combination with the acceptor-sensitizers of this invention. The results for each of the following examples were made in the same way as in the preceding examples which were representative of the practice of the invention.

EXAMPLE 22

A 10% solution of PVK was made in the mixed solvent 80/20 (%)=THF/cyclohexanone, and a coating on silicated aluminum was made with a #40 wire wound rod. This coating exhibited the following properties under tungsten radiation and 6 KV corona charge:

positive mode charge acceptance= +660 volts; residual voltage=non-applicable; dark decay=1 volt/sec; sensitivity to t($\frac{1}{2}$) of the decay curve bottom=40,500 μJ/cm$^2$.

negative mode charge acceptance=720 volts; residual voltage=non-applicable; dark decay=1 volt/sec; sensitivity to t($\frac{1}{2}$) of the decay curve bottom=37,800 μJ/cm$^2$.

EXAMPLE 23

A 10% solution of dibromopolyvinylcarbazole was made in the mixed solvent 70/30 (%)=THF/cyclohexanone and a coating was prepared as in Example 22. This coating exhibited the following properties under measurements identical to those in Example 22.

positive mode charge acceptance= +520 volts; residual voltage=not applicable; dark decay=1 volt/sec; sensitivity to t($\frac{1}{2}$) of the decay curve bottom=45,000 μJ/cm$^2$.

negative mode charge acceptance=45 volts; residual voltage=not applicable; dark decay=1 volt/sec; sensitivity to t($\frac{1}{2}$) of the decay curve bottom=48,000 μJ/cm$^2$.

EXAMPLE 24

Equal portions of PVK and polyvinyliodobenzocarbazole were made into a 10% solution of 80/20 (%)=THF/cyclohexanone and a coating was made of this non-sensitized formulation as in Example 22. The electrophotographic properties of this coating, obtained from measurements as in Example 22, were:

positive mode charge acceptance= +240 volts; residual voltage=non-applicable; dark decay=1 volt/sec; sensitivity to t($\frac{1}{2}$) of the decay curve bottom=15,200 μJ/cm$^2$.

negative mode charge acceptance= -170 volts; residual voltage=non-applicable; dark decay=1 volt/sec; sensitivity to t($\frac{1}{2}$) of the decay curve bottom=21,500 μj/cm$^2$.

When, as in Examples 20 and 21, use is made of a donor compound, such as triphenylamine, which is lacking in the characteristics of the binder, it is desirable to formulate the photoconductive coating composition to include a high polymeric or binder component, such as the Monsanto RP1323 resin in Examples 20 and 21. When use is made of such additional binder component, such binder may be selected of a wide variety of other synthetic or natural resinous or high polymeric material, such as vinyl chloride-vinyl acetate-maleic acid resin, marketed by Union Carbide Chemical Corporation under the designation VMCH; butadiene-styrene copolymer resin; organo silicon resin, such as marketed by Dow Chemical Company under the designation DC-996; polystyrene resin; acrylic or alkyl acrylic ester polymer and copolymers such as Acrylate A-10; chlorinated rubber such as Parlon; and alkyd resins such as marketed by General Electric Company under the name Glyptal 2469. When used, such resinous components may be employed in the coating composition in an amount within the range of 1 part by weight binder to 0.1-10 parts by weight of donor-sensitizer compound.

EXAMPLE 25

The preparation of an acceptor-sensitizer compound in which M is aluminum and is represented by the structural formula

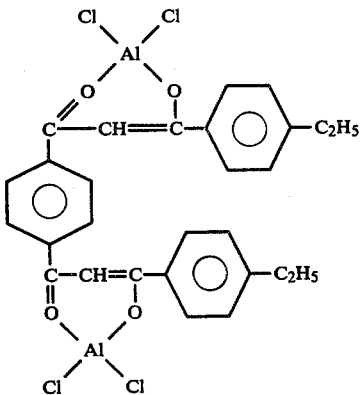

and Electrophotographic Properties of a coating with PVK.

The ligand

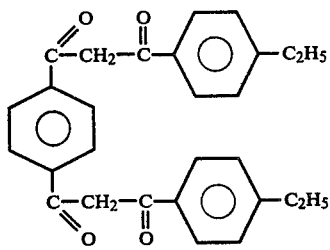

was prepared as indicated in the work on the boron dionates. Dimethoxyethane was dried over molecular sieve and degassed before its use as a solvent. Three grams of the ligand (9) were dissolved in ~200 ml of the hot solvent which was protected from the atmosphere by a nitrogen gas bubbler. A slight excess of two equivalents of anhydrous aluminum chloride (2.2 grams) was dissolved in ~150 ml of degassed glyme (dimethoxyethane) and this solution was added dropwise to the hot ligand solution over a period of one hour. The reaction mixture was refluxed for four hours, the solution concentrated by distillation to about half volume, cooled, and then poured into petroleum ether. A heavy oil separated which crystallized upon addition of some dimethoxyethane.

The crude product was processed through a Soxhlet extractor using toluene. The toluene solution was placed in the frigerator where a yellow solid crystallized.

The ligand had a melting point of 178°–180° C.

The reaction product did not melt less than 340° C.

The yield of crude material was 4.0 g from a possible 4.4 g.

EXAMPLE 25A

Preparation of Photoconductor

The recrystallized product from the Soxhlet extractor was blended with a 10% by weight solution of 50% by weight poly-N-vinylcarbazole and 50% by weight THF/cyclohexanone until the solution was saturated. The yellow solution was filtered under vacuum and made into a film coating on an aluminum substrate with a #40 wire wound rod.

EXAMPLE 25B

Electrophotographic Properties at 6 KV Corona and Tungsten Light

+charge acceptance=450 volts
+residual voltage=10 volts
+dark decay=<1.0 volts/sec.
+sensitivity: exposure to 1/e (charge acceptance)=3,700 µJ/cm$^2$
−charge acceptance+350 volts
−residual voltage=10 volts
−dark decay=3 volts/sec.
−sensitivity: exposure to 1/e (charge acceptance)=4,000 µJ/cm$^2$ The comparable data for PVK film alone was:
+charge acceptance=440 volts
+residual voltage=not applicable
+dark decay=<1 volt/sec.
+sensitivity: exposure to 1/e (charge acceptance)=15,400 µJ/cm$^2$
−charge acceptance=550 volts
−residual voltage=not applicable
−dark decay=2.0 volts/sec.
−sensitivity=exposure to 1/e (charge acceptance)=30,000 µJ/cm$^2$ Comparison of the charge decay with time shows that the aluminum acceptor compound of example 25 operates to sensitize the PVK film.

EXAMPLE 26

The preparation of an acceptor-sensitizer compound in which M is gallium and is represented by the structural formula

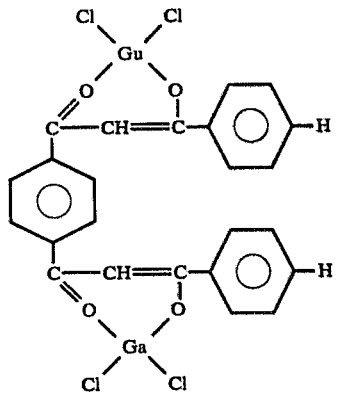

and Electrophotographic Properties of Coatings with PVK.

The ligand

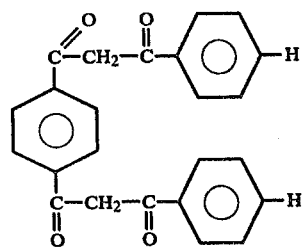

was prepared as described in the preparation of the boron dionates.

The solvent, dimethoxyethane, was dried and degassed as indicated before. Three grams of ligand was dissolved in the solvent which was heated to near reflux. As before, the reaction contents were protected from the atmosphere with a nitrogen bubbler. About two equivalents (~3 grams) of anhydrous Ga Cl₃ was dissolved in ~100 ml of dimethoxyethane and added dropwise to the refluxing ligand solution over an hour time. Reflux was continued during the working day for three days. The heat was disconnected to the reaction over night.

The dimethoxyethane solution was distilled to half volume, cooled, and added to twice the volume of heptane. A viscous oil separated. The heptane was evaporated to ~1/5 volume to yield some unreacted ligand.

The oil was diluted with methanol and this methanol solution was filtered. It was dried over sodium sulfate, filtered, and taken to dryness. This hygroscopic solid was dried in a dessicator.

The ligand had a melting point of 166°–167° C.

The reaction product did not melt <300° C. but did discolor at ~230 to a dark green-brown.

EXAMPLE 26A

Preparation of Photoconductor

A 10% solution (poly-N-vinylcarbazole) was saturated with the gallium dionate and a film coating made on an aluminum substrate with a #40 wire wound rod. The solvent for the PVK solution was 50%/50%-THF/cyclohexanone. The coating was cured for one hour at 80° C. It had a yellow-brown color.

EXAMPLE 26B

Electrophotographic Properties at 6 KV Corona and Tungsten Light

The saturated acceptor solution produced a film which accepted a charge of about 100 volts. This voltage could be discharged to show photoconductivity of the sample but the charge differential was so small that reliable numbers could not be associated with the process.

Films were made as above with acceptor concentrations of ½ and ¼ saturation. These gave electrophotographic properties as above.

EXAMPLE 27

The preparation of an acceptor-sensitizer compound in which M is indium as represented by the structural formula

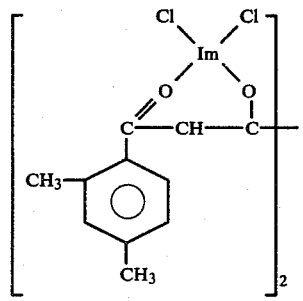

and Electrophotographic Properties of Coatings with PVK.

The ligand

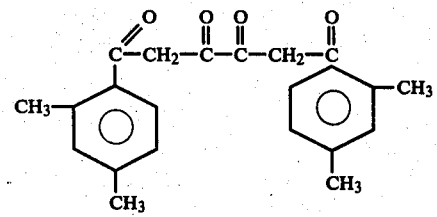

is the same as that prepared in example 1 except for the substitution of dimethylacetophenone for the 4'-ethylacetophenone. The solvent was prepared as indicated in the work on the boron dionates.

The solvent was prepared as indicated before and the general features of the preparation were similar to those involved for the preparation of the aluminum and gallium compounds. After reflux for three working days, the reaction was cooled and produced ⅔ of the original weight of ligand. The deep red-brown solution remaining after ligand isolation, was taken to dryness and diluted with methanol. A red-brown solution resulted together with a red-brown solid. This mixture was set in the freezer for a day after which the solid was filtered off. Total yield was ~0.4 gram.

The melting point of the ligand was 166°–167° C.

The melting point of the chelated product was 124°–128° C.

The ligand produced a very light yellow solution with PVK.

The product above produced a very deep red-orange solution with PVK.

EXAMPLE 27A

Preparation of Photoconductor

A 10% PVK solution (poly-N-vinyl carbazole) was blended with 0.16 g indium acceptor per 20 ml of PVK solution. Solutions were diluted to acceptor levels of 0.08 g/20 ml and 0.04 g/20 ml. Three coatings were made of these solutions on aluminum substrates with a #40 wire wound rod. The coatings were cured for one hour at 80° C. They were of a red-orange color.

EXAMPLE 27B

Electrical Properties at 6 KV Corona and Tungsten Light

The two high concentration levels of acceptor films were quite conductive in the dark so that a charge-acceptance level of ~100 volts only could be realized. The formulation level where acceptor was 0.04 g/20 ml gave the following electrophotographic data:
+ charge acceptance = 450 volts
+ residual voltage = nil
+ dark decay = 7 volts/sec.
+ sensitivity: exposure to 1/e (charge acceptance) = 3365 μJ/cm²
− charge acceptance = 525 volts
− residual voltage = nil
− dark decay = 13 volts/sec.
− sensitivity: exposure to 1/e (charge acceptance) = 4025 μJ/cm²

The comparable data for PVK FILM ALONE WAS:
+ charge acceptance = 440 volts
+ residual voltage = not applicable
+ dark decay = <1 volt/sec.

+sensitivity: exposure to 1/e (charge acceptance)=15,400 μJ/cm²
—charge acceptance=550 volts
—residual voltage=not applicable
—dark decay=2.0 volts/sec.
—sensitivity: exposure to 1/e (charge acceptance)=30,000 μJ/cm²

Comparison of the charge decay with time in these systems shows that the indium acceptor compound sensitized the PVK film.

In the examples, the abbreviations used have the following meanings:

$V_o$=charge acceptance
$V_R$=residual voltage
DD=dark decay
kt ⅓ =sensitivity to +C(⅓) of the decay bottom curve In the positive mode the voltage is (+), and in the negative mode the voltage is (−).

The oxalato-chelates of this invention in which the groups $Z_1$ and $Z_2$, as previously described, are selected from the group consisting of a substituted and unsubstituted, alkyl, alkaryl and heterocyclic group, such as furyl, pyrryl, idoyl, pyrimidyl, pyridyl, furfuryl and the like are produced by proper selection of the chelating agent $MR_3$ in which M is the metalloid as previously described and R corresponds to $Z_1$ and $Z_2$. By way of specific illustration wherein, in the preceding examples, boron trifluoride or aluminum chloride and their corresponding etherates have been used as the chelating agents, the boron trifluoride or aluminum chloride is substituted with the $MR_3$ compound as described above.

The described chelating agent can be made available through the well known Griguard reaction as illustrated by the following equation $$3RMgCl + BF_3 \rightarrow BR_3 + 3MgFCl,$$

wherein R is the substituted or unsubstituted alkyl, alkaryl or heterocyclic group as described above.

The following examples will illustrate the preparation of chelates in which $Z_1$ and $Z_2$ are other than fluorine or chlorine as in the preceding examples.

In the following example, a diketone is chelated with an alkoxyboron ester as illustrated by the following reaction:

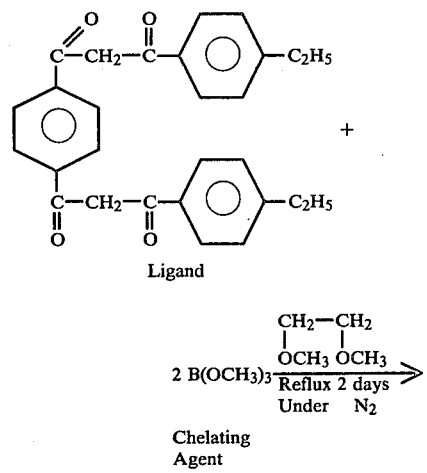

Ligand

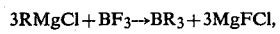

2 B(OCH₃)₃ $\xrightarrow[\text{Under N}_2]{\text{Reflux 2 days}}$

Chelating Agent

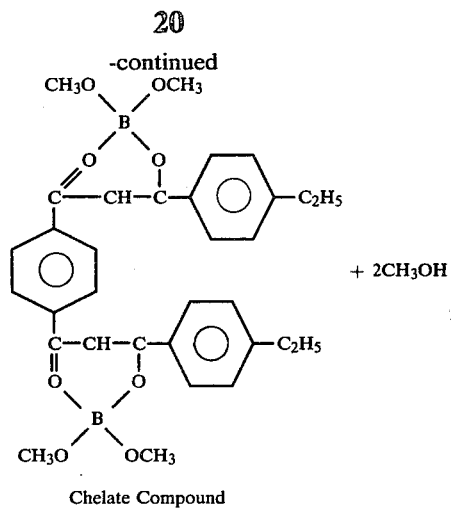

+ 2CH₃OH

Chelate Compound

EXAMPLE 28

Equivalent portions of reactants were kept at reflux of dimethoxyethane for two days under an envelope of $N_2$. A five gram portion of bis (ketone) above and 2.45 g of B(OCH₃)₃ were dissolved in 200 ml of degassed dimethoxyethane and brought to reflux. At the end of two days, ½ volume of the dimethoxyethane was distilled off under a $N_2$ stream and the reaction contents brought to room temperature. An equal volume of petroleum ether was added to increase the precipitation of solid and the mixture set in the freezer overnight. The deep yellow reaction product was vacuum filtered and washed with cold petroleum ether. The amount of solid isolated was 1.4 grams which amounted to 52% yield. It was recrystallized from THF to give a bright yellow solid with a M.P.>320° C. with decomposition.

Further examples: 28A

The ligand of example 28 is replaced in equivalent molar amounts with others of the ligand of the previous examples to produce the corresponding dimethoxy chelate.

Still further examples: 28C

The process of examples 28 and 28A is followed except that the B(OCH₃)₃ is replaced by corresponding molecular amounts of chelating agents in which the boron is replaced by another metalloid such as aluminum gallium, indium or thallium and the alkoxy group on the boron, aluminum, gallium, indium or thallium metalloid is replaced with an alkyl group such as ethyl, methylpropyl, butyl, pentyl, cyclopentyl and the like, an alkanyl group such as phenyl, tolyl, anthracyl and the like or a heterocyclic group such as furfuryl, pyrryl, idoyl, pyrimidyl, pyridyl and furfuryl including substituted and unsubstituted derivatives of the above or other alkoxy groups or in which R is an alkyl aralkyl or heterocyclic group substituted or unsubstituted as defined above.

EXAMPLE 29

A formulation was prepared utilizing 0.2 g of the electron acceptor identified by the structural formula (14) in 15 g of 9% PVK solution, in THF/Cyclohexanone=80%/20%. The formulation was applied to an aluminum substrate with a #70 ww rod. This coating was dried in the oven at 100° C. for 10 minutes and was found to have a thickness of approximately 9μ meters. The electrophotographic properties of this transparent coating were:

| Sensitivity to $t_{1/l}$ | Charge acceptance | Dark decay |
|---|---|---|
| +144 µJ/cm² | +550 volts | 8 volts/sec |
| −128 µJ/cm² | −800 volts | 5 volts/sec |

EXAMPLE 30

A formulation was prepared, as in example 29, utilizing 1.18 g of the compound (15) dissolved in 100 g of 5% PVK solution. The formulation was applied to an aluminum substrate by a small meniscus coater which gave a coating of approximately 15µ meters after being heated for 10 minutes at 100° C. The resulting yellow transparent coating had the following electrophotographic properties:

| Sensitivity to $t_{1/l}$ | Charge acceptance | Dark decay |
|---|---|---|
| +33 µJ/cm² | +750 volts | 4 volts/sec |
| −86 µJ/cm² | −900 volts | 8 volts/sec |

EXAMPLE 31

A formulation was prepared, as in example 30, utilizing 0.8 g (15) in 25 g of 22% Br₂PVK solution. The resulting transparent coating of approximately 11µ meters had the following electrophotographic properties:

| Sensitivity to $t_{1/l}$ | Charge acceptance | Dark decay |
|---|---|---|
| +144 µJ/cm² | +650 volts | 10 volts/sec |
| −255 µJ/cm² | −990 volts | 7 volts/sec |

EXAMPLE 32

A formulation was prepared utilizing 0.1 g of (17) dissolved in 100 g of 5% PVK solution. The formulation was applied to an aluminum substrate and processed as in example 30. The electrophotographic properties of this 10µ meter coating were:

| Sensitivity $t_{1/l}$ | Charge acceptance | Dark decay |
|---|---|---|
| +72 µJ/cm² | 750 volts | 2 volts/sec |
| −72 µJ/cm² | 800 volts | 5 volts/sec |

EXAMPLE 33

A formulation was prepared utilizing 0.9 g of (16) in 100 g of 5% PVK. The formulation was coated onto an aluminum substrate which was processed as described in example 30. The transparent 15µ meter had the following electrical properties:

| Sensitivity $t_{1/l}$ | Charge acceptance | Dark decay |
|---|---|---|
| +60 µJ/cm² | 900 volts | 7 volts/sec |
| −60 µJ/cm² | 900 volts | 7 volts/sec |

EXAMPLE 34

A formulation was prepared utilizing 0.055 g of (18) to sensitize 0.25 g of $$\left[ \left\langle \bigcirc \right\rangle \right]_3 N,$$

each distributed in 30 ml of 7% Monsanto Resin RP1323. A #60 wire wound rod was used to coat this formulation onto an aluminum substrate which was heated at 100° C. for 5 minutes. This transparent coating of 8µ meters had the following electrophotographic properties:

| Sensitivity $t_{1/l}$ | Charge acceptance | Dark decay |
|---|---|---|
| +3,150 µJ/cm² | +630 volts | +7 volts/sec |
| −4,200 µJ/cm² | −520 volts | −7 volts/sec |

The same formulation was applied to a transparent conductive film and this film was used to obtain, on its surface, toned reproductions of a target material from a commercial microfilm machine.

EXAMPLE 35

A formulation was prepared utilizing 0.9 g of (17) dissolved in 100 g of 5% PVK. This formulation was processed as in example 32 to give a 14µ meter coating whose electrophotographic properties were:

| Sensitivity $t_{1/l}$ | Charge acceptance | Dark decay |
|---|---|---|
| +12.6 µJ/cm² | +1000 volts | 7 volts/sec |
| −50 µJ/cm² | −600 volts | 7 volts/sec |

This example shows the electrophotographic effect of a higher acceptor/donor ratio than that given in example 32.

COMPOUNDS REFERRED TO IN EXAMPLES 30-35:

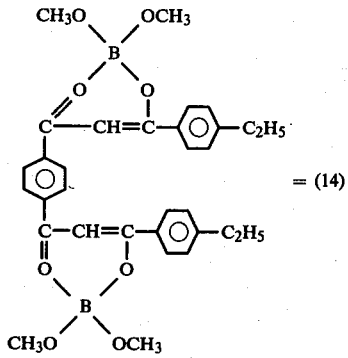

= (14)

-continued
COMPOUNDS REFERRED TO IN EXAMPLES 30-35:

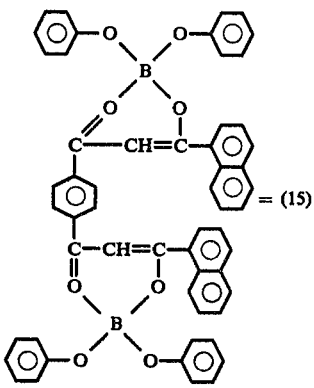 = (15)

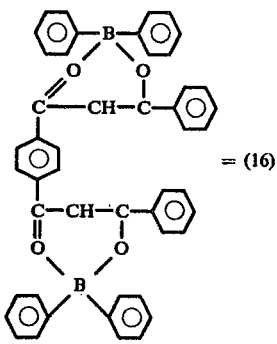 = (16)

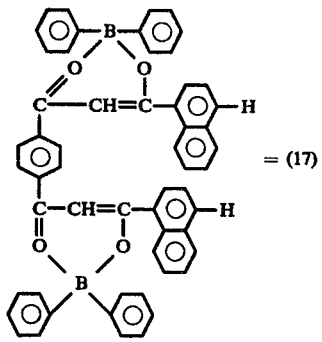 = (17)

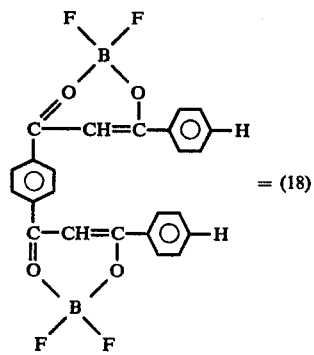 = (18)

EXAMPLE 36

The following is an example for the preparation of a multichelate, embodying the features of this invention, containing trifluoroacetoxy groups as ancillary ligands,

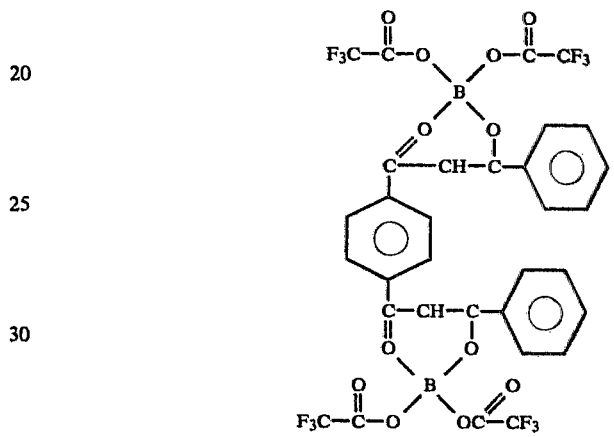

A 3.0 gram portion of the ketone was reacted with 5.7 gram portion of the boron compound in degassed domethoxyethane, at solvent reflux under a $N_2$ atmosphere. The reaction was carried out for 6 hours and the reaction mixture, when brought down to room temperature, was poured into twice the volume of petroleum ether. A yellow precipitate formed which was isolated by vacuum filtration. Recrystallization was done from THF addition of petroleum ether. MP behavior-=orange at 160° C.; black at 390° C.

A 0.45 gram portion of this acceptor compound (0.075 mole fraction) was blended with 1.4 g of PVK donor made into a 7% solution with the solvent 80/20=THF/cyclohexanone. A coating of this formulation was made on a 5 mil aluminum substrate with a #60 wire wound rod to give a coating thickness of approximately $5\mu$ meters after a cure time of 5 minutes at 100° C.

The electrophotographic properties of this coating after a period of dark adaptation were as follows, indicating that the compound possesses photoconductive properties:

| Sensitivity to $t_{1/l}$ | Charge acceptance | Dark decay |
|---|---|---|
| +23 µJ/cm² | +740 volts | 2 volts/sec |
| −81 µJ/cm² | −400 volts | 2 volts/sec |

It will be apparent from the foregoing that I have provided a new and improved photoconductive composition formulated of organic materials for use in the preparation of photoconductive elements having improved photoconductive characteristics.

It will be understood that changes may be made in the details of formulation, application and use, without departing from the spirit of the invention, especially as defined in the following claims.

I claim:

1. A composition for the preparation of photoconductive layers comprising the combination of an organic photoconductive donor and an acceptor-sensitizer compound having the general formula

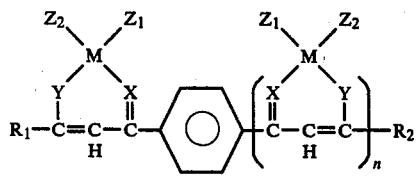

in which M is a metal or metalloid selected from the group consisting of aluminum, gallium, indium, thalium and boron, X and Y are groups selected from the group consisting of sulphur, nitrogen, phosphorus, antimony, selenium and oxygen, $Z_1$ and $Z_2$ are selected from the group consisting of a halogen and substituted and unsubstituted alkyl, alkaryl and heterocyclic groups selected from the groups consisting of furyl, pyrryl, idoyl, pyrimidyl, pyridyl and furfuryl, $R_1$ and $R_2$ are groups selected from the group consisting of substituted and unsubstituted aryl, alkaryl, alkyl and alicyclic groups, n is a number of 1 or 2, in which the composition used to form the layer contains the component in an amount within the range of 1-10% by weight, when in solution and 2-25% by weight, when in suspension.

2. A composition as claimed in claim 1 in which M is boron.

3. A composition as claimed in claim 1 in which M is boron and $Z_1$ and $Z_2$ are fluorine.

4. A composition as claimed in claim 1 in which X is oxygen.

5. A composition as claimed in claim 1 in which X and Y are oxygen, M is boron and $Z_1$ and $Z_2$ are fluorine.

6. A composition as claimed in claim 1 in which the substituents on the substituted alkyl, alkaryl and heterocyclic groups of $Z_1$ and $Z_2$ are the aryl, alkaryl, alkyl and alicyclic groups of $R_1$ and $R_2$ are selected from the group consisting of halogen groups, $C_1$-$C_{10}$ alkoxy groups, aryl groups, alkaryl groups, heterocyclic groups selected from the groups consisting of furyl, pyrryl, idoyl, pyrimidyl, pyridyl and furfuryl, $C_2$-$C_{10}$ alkylates, other substituted ligands, and electron withdrawing groups.

7. A composition for the preparation of photoconductive layers comprising the combination of an organic photoconductive donor and acceptor-sensitizer compound having the general formula

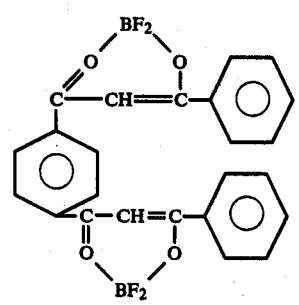

in which the composition used to form the layer contains the components in an amount within the range of 1-10% by weight, when in solution, and 2-25% by weight, when in suspension.

8. A composition for the preparation of photoconductive layers comprising the combination of an organic photoconductive donor and an acceptor-sensitizer compound having the general formula

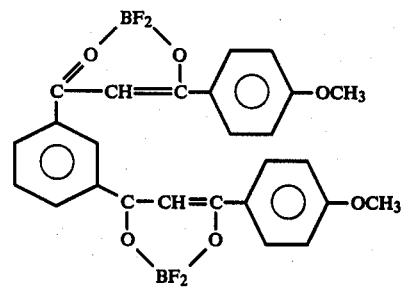

in which the composition used to form the layer contains the components in an amount within the range of 1-10% by weight, when in solution, and 2-25% by weight, when in suspension.

9. A composition for the preparation of photoconductive layers comprising the combination of an organic photoconductive donor and an acceptor-sensitizer compound having the general formula

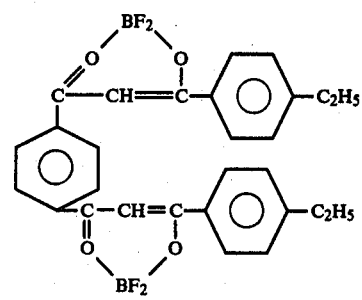

in which the composition used to form the layer contains the components in an amount within the range of 1-10% by weight, when in solution, and 2-25% by weight, when in suspension.

10. A composition as claimed in claim 1 in which, when the compounds are present in the composition in solution, they are present in the ratio of 1 part by weight acceptor-sensitizer to 3-500 parts by weight of donor.

11. A composition as claimed in claim 10 in which the compounds are present in the ratio of 1 part by weight acceptor-sensitizer per 10-200 parts by weight donor.

12. A composition as claimed in claim 1 in which, when the compounds are present in the composition in suspension, they are present in the ratio of 1 part by weight acceptor-sensitizer compound to 1–20 parts by weight of donor compound.

13. A composition as claimed in claim 1 in which, when the compounds are present in the composition in suspension, they are present in the ratio of 1 part by weight acceptor-sensitizer compound to 2–10 parts by weight of donor compound.

14. A composition as claimed in claim 1 in which the organic photoconductive donor is a polyvinyl carbazole and/or a halogenated derivative of polyvinyl carbazole.

15. A composition as claimed in claim 1 in which the organic photoconductive donor is triphenylamine.

16. A composition as claimed in claim 1 in which the acceptor-sensitizer is bis (boron difluoride)-1,6-bis(2,4-dimethylphenyl)-1,3,4,6-hexanetetraonate.

17. A composition as claimed in claim 1 in which the acceptor-sensitizer is bis(boron difluoride)-1,6-bis(4-ethylphenyl)-1,3,4,6-hexanetetraonate.

18. A composition as claimed in claim 1 in which the acceptor-sensitizer is bis(boron difluoride)-1,6-bis(4-fluorophenyl)-1,3,4,6-hexanetetraonate.

19. A composition as claimed in claim 1 in which the acceptor-sensitizer is bis(boron difluoride)-1,6-bis(4-bromophenyl)-1,3,4,6-hexanetetraonate.

20. A composition as claimed in claim 1 in which the acceptor-sensitizer is bis(boron difluoride)-1,6-bis(4-methoxyphenyl)-1,3,4,6-hexanetetraonate.

21. A composition as claimed in claim 1 in which the acceptor-sensitizer is bis(boron difluoride)-1,6-diphenyl-1,3,4,6-hexanetetraonate.

22. A photoconductive element comprising a conductive support having a photoconductive coating embodying the ingredients of the composition of claim 1.

23. A photoconductive element as claimed in claim 22 in which the coating is a cured coating which has been cured by heating to elevated temperature.

* * * * *